(12) United States Patent
Sachdev et al.

(10) Patent No.: US 9,563,923 B2
(45) Date of Patent: Feb. 7, 2017

(54) REVISING CONNECTION STRENGTHS IN A SOCIAL GRAPH

(71) Applicant: LinkedIn Corporation, Mountain View, CA (US)

(72) Inventors: Sanjay Sachdev, San Jose, CA (US); Abhishek Nigam, San Jose, CA (US)

(73) Assignee: LinkedIn Corporation, Sunnyvale, CA (US)

( * ) Notice: Subject to any disclaimer, the term of this patent is extended or adjusted under 35 U.S.C. 154(b) by 381 days.

(21) Appl. No.: 14/451,082

(22) Filed: Aug. 4, 2014

(65) Prior Publication Data

US 2016/0036661 A1    Feb. 4, 2016

(51) Int. Cl.
*G06Q 50/00*     (2012.01)
*H04L 12/58*     (2006.01)

(52) U.S. Cl.
CPC .............. *G06Q 50/01* (2013.01); *H04L 51/32* (2013.01)

(58) Field of Classification Search
CPC ...................................................... G06Q 50/01
See application file for complete search history.

(56) References Cited

U.S. PATENT DOCUMENTS

| | | | | |
|---|---|---|---|---|
| 8,606,721 B1* | 12/2013 | Dicker | ................. | G06Q 10/10 705/319 |
| 8,773,437 B1* | 7/2014 | Goldman | ............... | G06Q 50/01 345/440 |
| 8,825,584 B1* | 9/2014 | Miller | ..................... | G06F 17/00 706/50 |
| 9,317,610 B2* | 4/2016 | Vaynblat | ............... | G06F 3/0481 |
| 9,342,624 B1* | 5/2016 | Ojha | ....................... | G06Q 50/01 |
| 2013/0007126 A1* | 1/2013 | Ziemann | ............... | G06Q 50/01 709/204 |
| 2013/0254213 A1* | 9/2013 | Cheng | ................... | G06Q 50/01 707/748 |
| 2013/0254280 A1* | 9/2013 | Yang | ...................... | G06Q 50/01 709/204 |
| 2013/0311563 A1* | 11/2013 | Huberman | ............. | G06Q 50/01 709/204 |
| 2014/0194208 A1* | 7/2014 | Splaine | .................. | G06Q 30/02 463/42 |
| 2015/0058277 A1* | 2/2015 | Ioannidis | .......... | G06F 17/30958 706/52 |

* cited by examiner

*Primary Examiner* — William Spieler
(74) *Attorney, Agent, or Firm* — Park, Vaughan, Fleming & Dowler LLP

(57) ABSTRACT

During a feedback technique, a system that provides a social network requests feedback regarding an initial connection strength associated with an edge between two nodes in the social graph, which are associated with an entity and a counterparty, respectively. Note that the social graph represents interactions among users of the social network. Based on the feedback, the system determines a directional asymmetry between revised connection strengths received from the entity and the counterparty. Then, the system performs a remedial action based on the determined directional asymmetry, such as adjusting the connection strength of the edge. In addition, the remedial action may include: feedback about an accuracy of the initial connection strength, estimating a power distance between the entity and the counterparty, and/or encouraging interaction between the entity and the counterparty.

20 Claims, 6 Drawing Sheets

REVISING CONNECTION STRENGTHS IN A SOCIAL GRAPH

BACKGROUND

Field

The described embodiments relate to techniques for revising connection strengths associated with edges between nodes in a social graph. More specifically, the described embodiments relate to techniques for revising the connection strengths based on user feedback.

Related Art

Social networks are an increasingly popular format for aggregating and interconnecting individuals who have similar interests. For example, a website may provide a professional social network for individuals in the workforce. These users may 'connect' with each other, thereby defining subsets of interrelated users in the social network. In principle, these interrelated users can facilitate a wide variety of value-added services, such as helping: the users find employment, employers recruit employees, educational institutions identify prospective students, etc. More generally, the interrelated users in a social network may facilitate targeted communication among the users.

In practice, these capabilities are typically implemented with a social graph that represents the interrelationships among the users of the social network. In particular, the social graph may include multiple nodes that are associated with the users or groups of users (such as businesses, educational institutions, clubs and, more generally, organizations) that are connected by edges. Moreover, a given edge between a pair of nodes may have an associated weight or connection strength. The connection strengths usually play an important role in analysis techniques that attempt to leverage the social graph to provide the value-added services. For example, when a user wishes to conduct business with a particular company, the cascading interrelationships specified by the connection strengths in the social graph (such as among the user and other users of the social network) may be used to identify friends of friends or indirect professional colleagues who may be good contact points in the company for the user to contact.

However, it is often difficult to accurately determine the connection strengths. For example, a provider of the social network often attempts to infer or estimate the connection strengths based on user activity in the social network (such as an average frequency of communication, a time since a last message between the users, etc.), user profiles (such as how long ago the users worked together or attended the same educational institution) and/or overlap between users' connections. Moreover, error or uncertainty in the estimated connection strengths often degrades the accuracy of analysis of the social graph, which cause a commensurate negative impact on the value-added services. For example, when trying to use the social graph to identify contact points in an organization, errors in the estimated connection strengths are compounded. Consequently, paths through the social graph that involve multiple edges and nodes (and, in particular, more than two or three degrees of separation from the user) may not provide useful information, which is often frustrating to the users.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
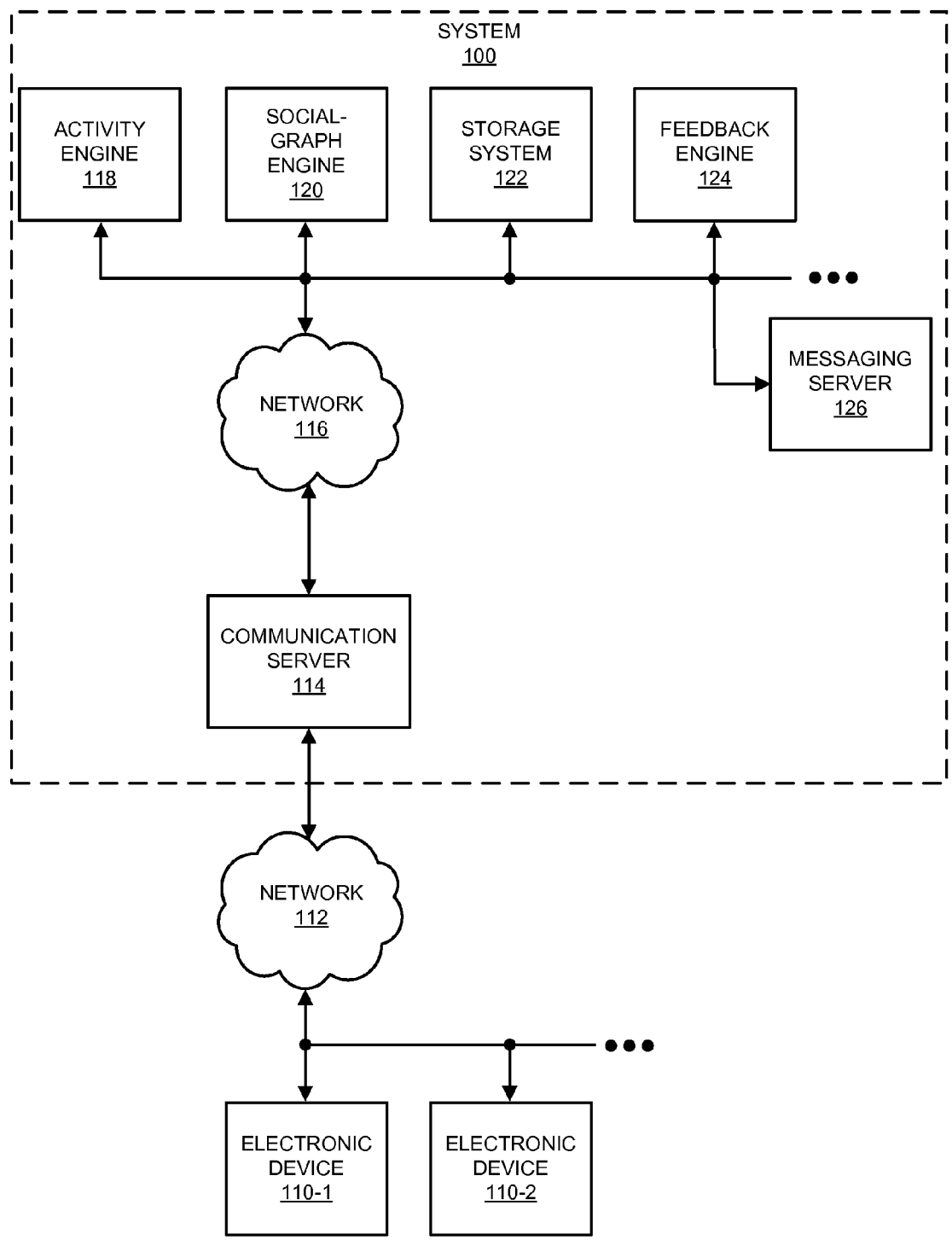
FIG. 1 is a block diagram illustrating a system that provides a social network in accordance with an embodiment of the present disclosure.

Embodiments of a system that provides a social network and a technique for adjusting a connection strength in a social graph that represents interrelationships among users of the social network are described. During operation, the system requests feedback about an initial connection strength associated with an edge between two nodes in the social graph, which, respectively, are associated with an entity and a counterparty. Based on the feedback, the system determines a directional asymmetry between revised connection strengths received from the entity and the counterparty. Then, the system performs a remedial action based on the determined directional asymmetry, such as adjusting the connection strength of the edge. Instead or in addition, the remedial action may include: feedback about an accuracy of the initial connection strength, estimating a power distance between the entity and the counterparty, and/or encouraging interaction between the entity and the counterparty (e.g., the system may provide an encouragement message to encourage interaction).

In this way, the system may leverage the feedback from the entity and the counterparty to improve the accuracy of the connection strength and, thus, the accuracy of the social graph. This improved accuracy may allow the system to provide better value-added services. In particular, by improving the accuracy of the interrelationships represented by the social graph, this feedback technique may improve the accuracy of recommendations and analysis that are determined based on the social graph. For example, the social graph may be used to correctly identify contact points, even when this involves multiple edges and nodes in the social graph (and, in particular, more than two or three degrees of separation from a node representing a given user of the social network). Consequently, the feedback technique may allow the system to use the social graph to provide more useful information, thereby increasing: the quality of the user experience, user satisfaction and retention, the value of the social graph, and/or the revenue and profitability of a provider or host of the system.

Note that the feedback technique is not an abstract idea. In particular, the adjustment of the connection strength included in the feedback technique is not: a fundamental economic principle, a human activity (the calculations involved in the operations in the feedback technique may significantly exceed those of a human because of the very large number of users of the social network), and/or a mathematical relationship/formula. Moreover, the feedback technique amounts to significantly more than an alleged abstract idea. In particular, the feedback technique improves the functioning of a computer or the computer system that executes software and/or implements the feedback technique. For example, by improving the accuracy of the social graph, the feedback technique: improves reliability of the computations that underlie the value-added services, and/or improves the user-friendliness of a user interface that displays results of the computations and the value-added services.

In the discussion that follows, an individual or a user may include a person (for example, an existing user of a social network or a new user of the social network). Also, or instead, the communication technique may be used by an organization, a business, and/or a government agency. Furthermore, a 'business' should be understood to include for-profit corporations, non-profit corporations, groups (or cohorts) of individuals, sole proprietorships, government agencies, partnerships, etc.

We now describe embodiments of the system and its use. FIG. 1 presents a block diagram illustrating a system 100 that performs the feedback technique. In this system, users of electronic devices 110 may use a software product, such as instances of a software application that is resident on and that executes on electronic devices 110. In some implementations, the users may interact with a web page that is provided by communication server 114 via network 112, and which is rendered by web browsers on electronic devices 110. For example, at least a portion of the software application executing on electronic devices 110 may be an application tool that is embedded in the web page, and that executes in a virtual environment of the web browsers. Thus, the application tool may be provided to the users via a client-server architecture.

The software application operated by the users may be a standalone application or a portion of another application that is resident on and that executes on electronic devices 110 (such as a software application that is provided by communication server 114 or that is installed on and that executes on electronic devices 110).

Figure 2:
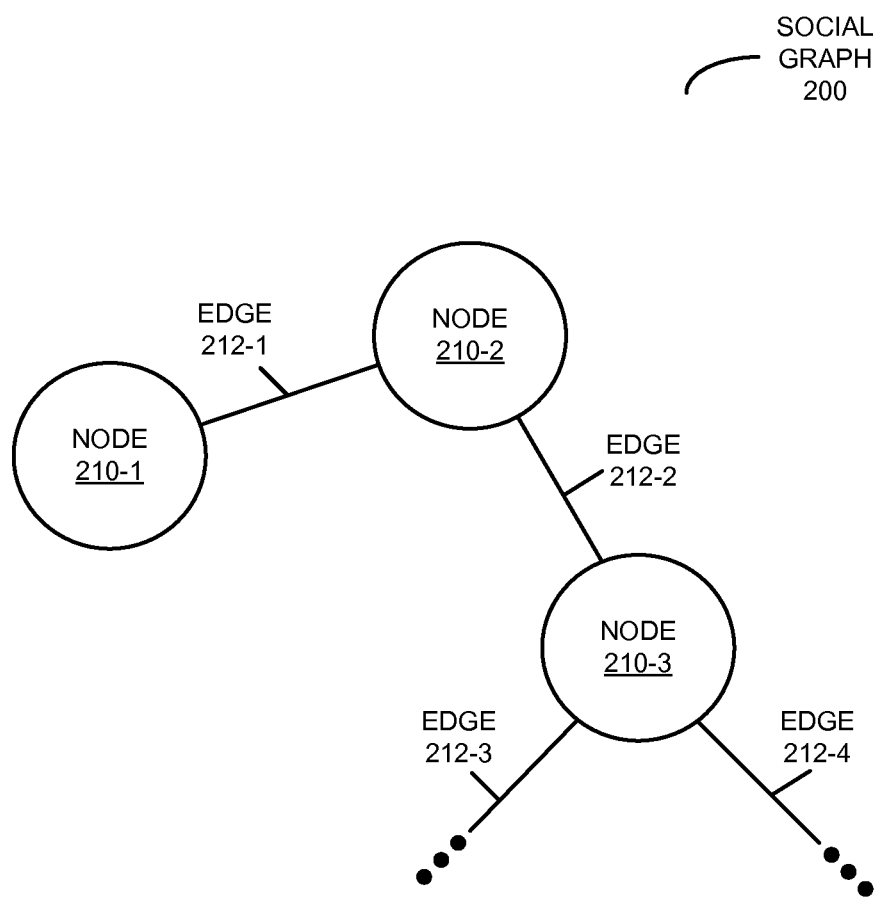
FIG. 2 is a drawing illustrating a social graph that represents interrelationships among the users of system 100 in FIG. 1 in accordance with an embodiment of the present disclosure.

Using one of electronic devices 110 (such as electronic device 110-1) as an illustrative example, a user of electronic device 110-1 may use the software application to interact with other users in a social network (and, more generally, a network of users), such as a professional social network, that facilitates interactions among the users. Note that each of the users of the software application may have an associated user profile that includes personal and professional characteristics and experiences (such as education, employment history, demographic information, work locations, etc.), which are collectively referred to as 'attributes' in the discussion that follows. As illustrated in FIG. 2, which presents a drawing of social graph 200, the interactions among the users may help define a social graph in which nodes correspond to the users and edges between the nodes correspond to the users' interactions, interrelationships, and/or connections. In particular, social graph 200 may represent the connections or interrelationships among nodes 210 using edges 212. In the context of the feedback technique, one of nodes 210 (such as node 210-1) may correspond to the user (or other entity), and the remainder of nodes 210 may correspond to other users (or groups of users) in the social network (which are referred to as 'counterparties' to the entity). Therefore, edges 212 may represent interrelationships among different entities and corresponding counterparties.

More generally, a given node in social graph 200 may be associated with a wide variety of information that is included in the user profiles, including attributes such as: age, gender, geographic location, work industry for a current employer, functional area (e.g., engineering, sales, consulting), seniority in an organization, employer size, schools attended, previous employers, current employer, professional development, interest segments, target groups, additional professional attributes, and/or inferred attributes (which may include or be based on user behaviors). Furthermore, user behaviors may include log-in frequencies, search frequencies, search topics, browsing certain web pages, locations (such as IP addresses) associated with the users, advertising or recommendations presented to the users, user responses to the advertising or recommendations, likes or shares exchanged by the users, and/or interest segments for the likes or shares.

Referring back to FIG. 1, while the users of electronic devices 110 are using the software application, communication server 114 may provide content to one or more of electronic devices 110 via network 112. For example, the content may include summaries of a user's connections with other users as well as messages, such as an invitation message with an invitation to connect with another user of the social network (which is sometimes referred to as a 'member-to-member invitation'). In the discussion that follows, a 'message' may include a verbal, written, or recorded communication sent to or left for a recipient, such as an email or instant message. Note that a message may be communicated via the software application or may be communicated to a separate dedicated application that executes in the environment of electronic device 110-1.

Over time, via network 116, an activity engine 118 in system 100 may track users' activities in the social network (such as viewing of web pages, messages sent and received, accepted invitations and, more generally, interactions with system 100 and other users in the social network) and may determine histories of user activity. Then, activity engine 118 may store the histories of user activity in a data structure (which is stored in a computer-readable memory, such as storage system 122 that may encompass multiple devices, i.e., a large-scale storage system).

Based on the histories of user activity and the user profiles, social-graph engine 120 may estimate or infer connection strengths or weights associated with edges between nodes in the social graph. For example, existing connections between users of the social network (who may be associated with nodes in the social graph) may have non-zero connection strengths. Moreover, users who currently work together at a company or organization may have greater or larger connection strengths than users who never worked at the same company or organization, or who worked together previously but do not currently work together.

Similarly, users who attended the same educational institution (such as a college or university), or who have the same major or specialty, may have more significant connection strengths with each other than with other users. Furthermore, users who communicate frequently (such as weekly or monthly) may have greater or larger connection strengths than users who have not communicated within some threshold period of time (e.g., three or six months).

In addition, social-graph engine 120 may compare subsets of the social graph associated with different users (such as the interrelationships or connections in the social graph among a particular collection of users). For those users that have significant overlap in their connections (e.g., more than 50% common nodes), social-graph engine 120 may assign or infer a larger connection strength.

Note that connection strengths may be normalized, so that they range between 0 and 1. Social-graph engine 120 may store the estimated connection strengths, as well as other details of the social graph, in a data structure (which is stored in a computer-readable memory, such as storage system 122).

However, this approach to estimating the connection strengths may be prone to error. Consequently, the estimated connection strengths (which are sometimes referred to as 'initial connection strengths') may have large uncertainties or inaccuracies. Because these uncertainties can degrade the quality and accuracy of value-added services that are based on the social graph, feedback engine 124 may perform a feedback technique described herein to improve the accuracy of the connection strengths and, thus, the accuracy of the social graph. In turn, this may improve the value-added services that are based on the social graph, which may improve: the user experience when using the social network, the usefulness of the social network to the users, the value of the social network to advertisers, and other potential revenue sources for a provider of system 100 and the social network.

In particular, feedback engine 124 may instruct messaging server 126 to provide, via network 116, communication server 114, and network 112, requests to the users on electronic devices 110. A given request may be dispatched via a communication method such as electronic mail, Short Message Service, and/or telephone. Alternatively, the request may be displayed on or included in the web page associated with the social network using a web browser and/or within the software application, and the users may be prompted to activate a link in order to provide feedback. In addition, the request for feedback may occur when the user accepts an invitation to establish a connection with another individual in the social network.

Using as an illustrative example an email message sent to one individual user of the social network (or some other entity that corresponds to a node of the social graph), the one user may be informed that a connection between that user and another user in the social network has been assigned an initial or current strength of 0.7. The recipient of the message may then be asked to provide feedback about that connection strength. For example, the email may ask the one user if this estimated connection strength is correct. If not, he or she may be asked to provide a corrected or a revised value.

Illustratively, the recipient of the message may do so by interacting with a graphical-user-interface control object (e.g., by touching a virtual icon on a touchscreen or a user interface, clicking on the control object using a mouse), such as a slider that allows the user to select values between 0 and 1 (e.g., the connection strengths may have real values between 0 and 1). To assist the user in providing the feedback, the email may include context information, such as a range of strengths among the user's connections in the social graph (i.e., the connection strengths between the user and multiple counterparties) or a range of strengths among connections in the social graph for users having similar user profiles and/or histories of activity. In addition, the context information may indicate an estimate of the certainty or uncertainty of the connection strength (e.g., with error bars or color coding).

Messaging server 126 may forward feedback that it receives to feedback engine 124. Then, based on the revised connection strengths received from the users, feedback engine 124 may revise or adjust the connection strengths in the social graph and, more generally, may perform one or more remedial actions. In some implementations, feedback engine 124 compares the revised connection strength received from a user with the initial connection strength. If the difference is greater than some threshold percentage of the initial strength (e.g., 10%, 25%, 50%), the connection strength may be updated or adjusted, and the new connection strength may be stored in the data structure.

In some embodiments, updates to the connection strength are applied incrementally. For example, systematic under-relaxation based on a difference between the revised connection strength and the initial connection strength may be used, so that the changes to the connection strength are bounded. In particular, the initial connection strength may only be updated using a fraction or portion of the difference at a given time or update iteration. This slow updating of the connection strength may reduce the impact of noise and/or help prevent oscillations or swings in the connection strength. Thus, the adjustment to the connection strength may be the product of the difference and a fraction $\alpha$ (which is between 0 and 1). Consequently, for a difference of 0.5 (or 50%) and $\alpha$ of 0.1, the increment or decrement to the initial connection strength may be 0.05. This approach may allow the initial connection strength and one or more revised connection strengths to be blended or to evolve over time. It may also help ensure that the revised connection strength received at any given time does not unduly skew or alter the connection strength associated with the edge.

Furthermore, after the update or the increment to the initial connection strength, the adjusted connection strength may be normalized. For example, the normalization may be based on an average of connection strengths associated with edges between the user and multiple counterparties in the social graph other than the counterparty for which the feedback was requested (i.e., other than the counterparty for the edge associated with the initial connection strength). Alternatively, the normalization may be based on an average of connection strengths associated with edges for multiple users in the social graph (which may or may not include the user and/or the counterparty). This approach may reduce the variation or the noise in the connection strengths in the social graph.

Alternatively or additionally, other techniques may be used to reduce systematic variation in the connection strengths. For example, the responses (and, in particular, the response quality) to requests for feedback may vary as a function of time. Thus, the responses on a Monday (when the users may be busy) may be less accurate than the responses received on Tuesdays or Wednesdays. Consequently, the update to the initial connection strength may be based on the time variation in responses from the user to previous requests regarding connection strengths associated with edges between the entity and multiple other counterparties. Thus, in the preceding example, revised connection strengths received on Tuesdays or Wednesdays may result in a larger change or increment to the initial connection strength than those received on Mondays. Note that the time variation in the user responses may be associated with a day of the week, a time of the month, a time of year, or some other time period (e.g., there may be a seasonal or other cyclical variation in the user's responses).

In some embodiments, feedback engine 124 revises or adjusts the connection strength for an edge based on revised connection strengths received from the entity and the counterparty. For example, feedback engine 124 may determine a directional asymmetry between a first revised connection strength received from the entity and a second revised connection strength received from the counterparty. In particular, if the directional asymmetry is greater than a threshold value (such as 50%), then the initial connection strength may not be adjusted. However, if the directional asymmetry is less than the threshold value (i.e., the entity and the counterparty essentially agree on the strength of their interactions), feedback engine 124 may adjust or update the initial connection strength (such as by using the average of the first connection strength and the second connection strength). In this way, the initial connection strength may be updated when there is reasonable agreement (as indicated by the comparison of the directional asymmetry to the threshold value) between the feedback about the initial connection strength from the entity and the counterparty.

More generally, feedback engine 124 may perform one or more remedial actions based on the first revised connection strength and, optionally, the second revised connection strength. Instead of or in addition to adjusting the initial connection strength, the remedial action may include: estimating a power distance between the entity and the counterparty; providing feedback about an accuracy of the initial connection strength (and, thus, validating or correcting an inference engine that estimated the initial connection strength); and/or encouraging communication or other interaction between the entity and the counterparty (e.g., providing an encouragement message to encourage interaction).

For example, feedback engine 124 may use the directional asymmetry and/or a temporal pattern of upgrades or downgrades (increases or decreases) in initial connection strengths to estimate a power distance between the entity and the counterparty. Note that 'power distance' may reflect a difference in: seniority in an organization, titles of the entity and the counterparty, a number of direct reports and, more generally, an influence on other individuals and organizations. Thus, an individual with a higher power distance may: be more senior, have a higher position (such as Vice President), have more direct reports and/or more influence on other individuals and organizations.

A large directional asymmetry (e.g., where the entity thinks the connection strength with the counterparty is much larger than the counterparty does), such as 50%, may indicate a large power distance (in this example, the counterparty may have more power than the entity). Similarly, if, over time, the counterparty provides revised connection strengths that are lower than the initial connection strengths for multiple users in the social graph, it may indicate that the counterparty has a high power distance (i.e., more power). In contrast, if, over time, the counterparty provides revised connection strengths that are higher than the initial connection strengths of the multiple users, it may indicate that the counterparty has a low power distance (i.e., less power). Furthermore, when the first revised connection strength is less than the second revised connection strength, feedback engine 124 (via messaging server 126) may encourage the entity to interact with the counterparty, but when the first revised connection strength is greater than the second revised connection strength, feedback engine 124 may encourage the counterparty to interact with the entity. For example, feedback engine 124 may instruct messaging server 126 to send a message to the entity (or, respectively, the counterparty) recommending that he or she contact the counterparty (or the entity) by sending them a message. Alternatively or additionally, feedback engine 124 may instruct messaging server 126 to send a message to the entity (or the counterparty) advising them about organizations they can join or events they can attend where they can interact in person with the counterparty (or the entity).

In some embodiments, feedback engine 124 uses the revised connection strength to detect spoof or fake users of the social network. Thus, if the revised connection strengths are always the same or if there is never a response to requests for feedback about initial connection strengths, feedback engine 124 may suspect that the associated user accounts may be fakes.

By improving the accuracy of the connection strengths, system 100 may improve the accuracy of the social graph. In turn, this may allow system 100 to provide more accurate and useful information to the users of the social network. For example, target contact points in organizations may be accurately identified, even when they involve multiple hops across or within the social graph (or multiple degrees of separation from any given individual). Alternatively or additionally, people a user may know (either in the social network or outside of the social network) may be identified, so that the user can select individuals to whom they want to send connection invitations (thereby helping to increase the size of the social network).

In the absence of revised or adjusted connection strengths, these types of analysis usually compound existing errors or uncertainty in the connection strengths and, thus, often result in poor or erroneous recommendations. Therefore, through feedback techniques provided herein, system 100 may maintain or increase the number of users in the social network, and may offer improved services to the users and advertisers, in the form of more effective advertisements (which are presented to the users of the social network), recommendations, employment opportunities, and/or interesting content. Consequently, a feedback technique implemented in system 100 may increase the satisfaction of both users and advertisers, and may increase the revenue and profitability enjoyed by a host or provider of the software application and the social network.

Note that information in system 100 may be stored at one or more locations (i.e., locally and/or remotely). Moreover, because this data may be sensitive in nature, it may be encrypted. For example, stored data and/or data communicated via networks 112 and/or 116 may be encrypted.

Figure 3:
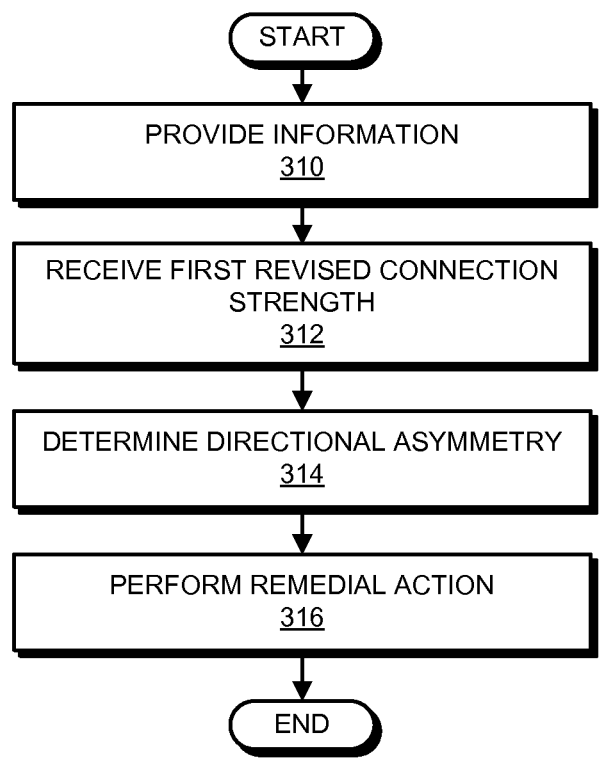
FIG. 3 is a flow chart illustrating a method for adjusting a connection strength in the social graph of FIG. 2 in accordance with an embodiment of the present disclosure.

We now describe embodiments of the feedback technique. FIG. 3 presents a flow chart illustrating a method 300 for adjusting a connection strength in a social graph, which may be performed by a computer system (such as system 100 in FIG. 1 or computer system 600 in FIG. 6). During operation, the computer system provides, to one entity, information (operation 310) specifying the initial connection strength associated with the edge between two nodes in the social graph, where the two nodes represent, respectively, the entity and a counterparty. For example, the information may be included on a landing page within the social network to which the entity is directed upon connection to system 100, or in one or more emails or other messages sent to the entity. Note that the information may include a range of connection strengths associated with edges between the entity and multiple counterparties in the social graph.

Then, the computer system receives a first revised connection strength (operation 312) from the entity. For example, the entity may select one of a range of possible values for the first revised connection strength, such as by sliding a slider in a user interface, directly entering a value, etc.

Moreover, the computer system determines the directional asymmetry (operation 314) between the first revised connection strength and a second revised connection strength provided by the counterparty. For example, the directional asymmetry may be determined by taking the difference between the first revised connection strength and the second revised connection strength.

Next, the computer system performs a remedial action (operation 316) regarding an adjusted connection strength of the edge based on the determined directional asymmetry. For example, the remedial action may include updating the initial connection strength associated with the edge based on the determined directional asymmetry. Thus, the updated or adjusted connection strength may be the sum of the initial connection strength and the determined directional asymmetry. If only the entity provides a revised connection strength (i.e., the counterparty does not provide a revised strength), the remedial action may be based on just the one revised connection strength, to the extent possible.

In some embodiments, prior to updating or adjusting the initial connection strength, the computer system compares the first revised connection strength and the initial connection strength, and the update is based on the comparison. For example, if the difference between the first revised connection strength and the initial connection strength is larger than 50% of the initial connection strength, the computer system may bound or limit the size of the change (e.g., the change may not exceed 50% of the initial connection strength). More generally, updates or adjustments to the initial connection strength may involve systematic under-relaxation based on the difference between the first revised connection strength and the initial connection strength.

Note that the updated or adjusted connection strength may be normalized based on an average of connection strengths associated with edges between the entity and multiple counterparties in the social graph other than the counterparty. Similarly, the updates or adjustments to the initial connection strength may be based on time variation among responses from the entity to previous requests regarding connection strengths associated with edges between the entity and multiple counterparties in the social graph other than the counterparty. These operations may reduce noise and/or systematic variations in the reported connection strengths.

Alternatively or additionally, the remedial action may include: estimating the power distance (or the difference in power, authority, or social standing) between the entity and the counterparty based on the determined directional asymmetry; providing feedback about the accuracy of the initial connection strength; and/or encouraging communication between the entity and the counterparty based on the directional asymmetry (e.g., providing an encouragement message to encourage interaction). Thus, the entity may be encouraged to interact with the counterparty when the first revised connection strength is less than the second revised connection strength, and the counterparty may be encouraged to interact with the entity when the first revised connection strength is greater than the second revised connection strength. Such interactions may improve the connection or interactions between the entity and the counterparty (which may, over time, result in the entity and the counterparty reporting a smaller directional asymmetry).

In this way, the feedback technique can improve the accuracy of connection strengths in the social graph. This approach may help ensure that recommendations, analysis and, more generally, value-added services that are based on the social graph are useful to the users of the social network, as well as advertisers and other potential revenue sources. Consequently, a feedback technique provided herein may improve the social network by increasing user retention and new user recruiting (and, thus, by maintaining or increasing the number of users of the social network), as well as the value of the social network to the users, advertisers, partners, etc.

In some embodiments of method 300, there may be additional or fewer operations. Moreover, the order of the operations may be changed, and/or two or more operations may be combined into a single operation.

Figure 4:
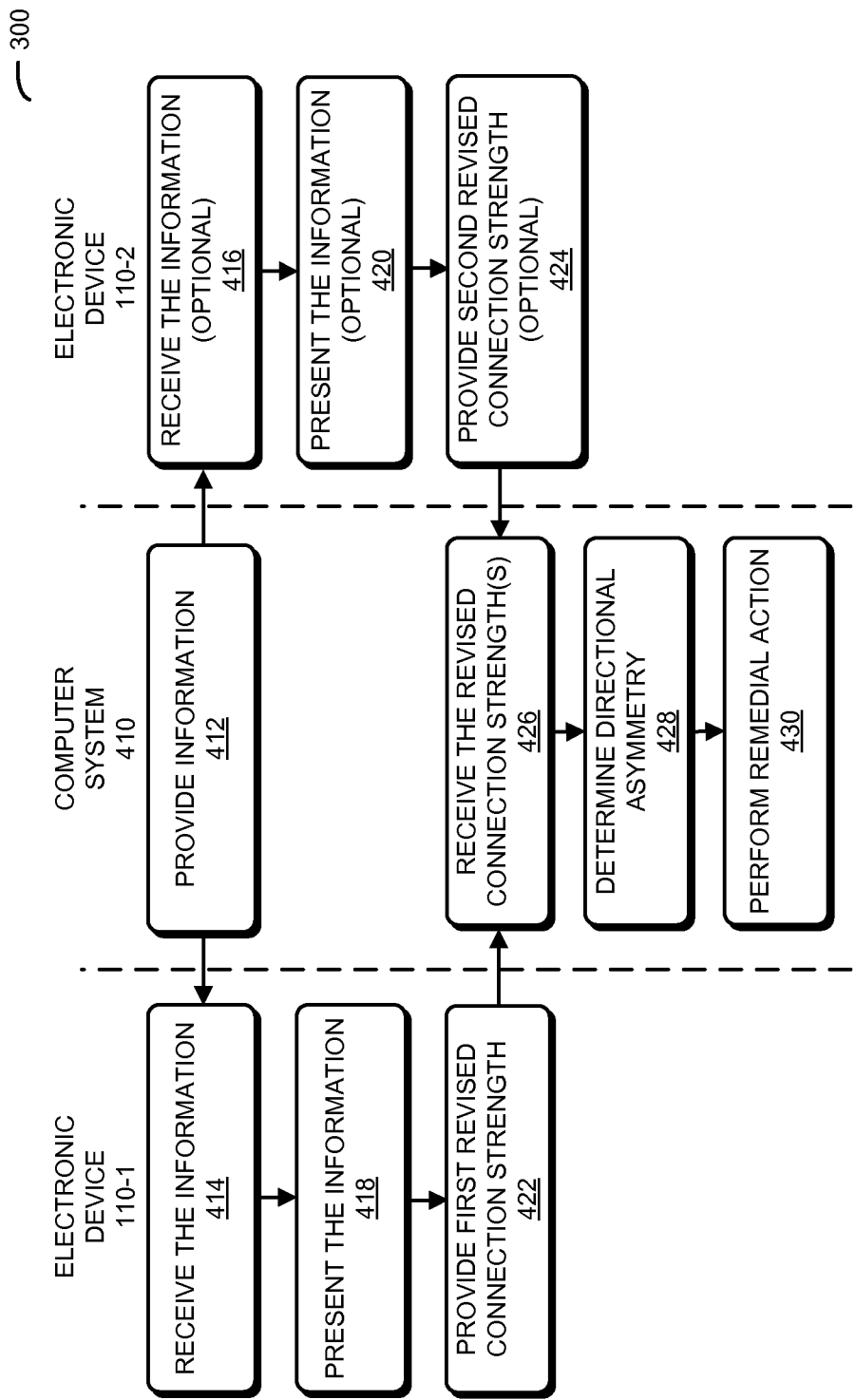
FIG. 4 is a flow chart illustrating the method of FIG. 3 in accordance with an embodiment of the present disclosure.

In an exemplary embodiment, a feedback technique is implemented using one or more electronic devices and at least one server (and, more generally, a computer system), which communicate through a network, such as a cellular-telephone network and/or the Internet (e.g., using a client-server architecture). This is illustrated in FIG. 4, which presents a flow chart illustrating method 300 (FIG. 3). During this method, computer system 410 may provide information (operation 412) specifying the initial connection strength associated with the edge between two nodes in the social graph, where the two nodes are, respectively, associated with the entity (such as a user of electronic device 110-1) and the counterparty (such as a user of electronic device 110-2).

After receiving the information (operations 414 and, optionally, 416), electronic device 110-1 (and, optionally, electronic device 110-2) may present (operations 418 and, optionally, 420) the information to the entity (and, optionally, the counterparty). Then, after receiving one or more response(s) from the entity and the counterparty, electronic device 110-1 (and, optionally, electronic device 110-2) may provide (operations 422 and, optionally, 424) the first revised connection strength and the second revised connection strength.

Computer system 410 receives (operation 426) either or both of these revised connection strengths. Next, computer system 410 determines the directional asymmetry (operation 428) based on the first revised connection strength and the second revised connection strength. Furthermore, computer system 410 performs the remedial action (operation 430) based on the determined directional asymmetry, such as adjusting or updating the initial connection strength. If the second revised connection strength is not received, computer system 410 may apply remedial action based on the difference between the initial/estimated connection strength and the first revised connection strength.

Figure 5:
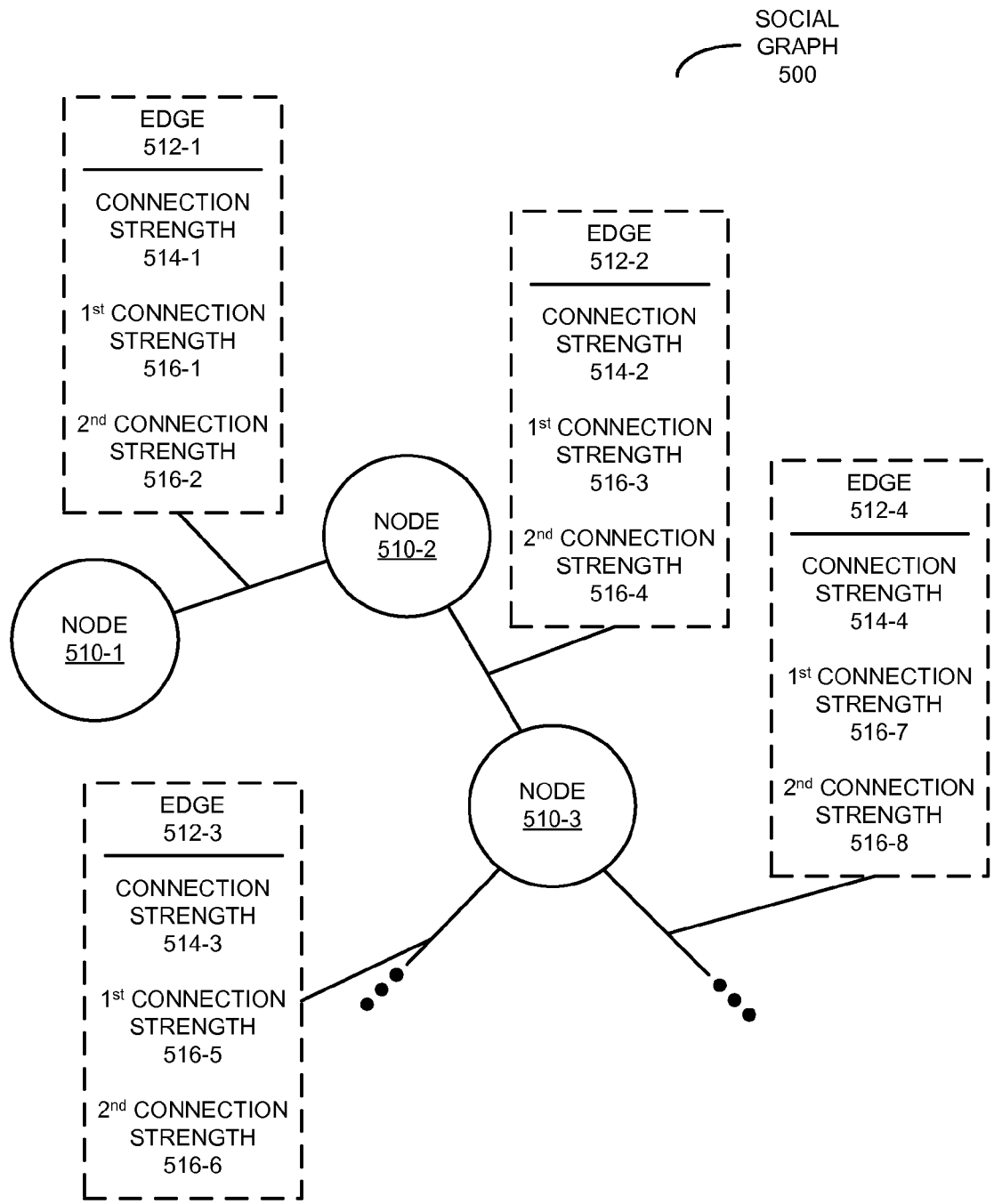
FIG. 5 is a drawing illustrating a social graph that represents interrelationships among the users of system 100 in FIG. 1 in accordance with an embodiment of the present disclosure.

As shown in FIG. 5, which presents a drawing of social graph 500, connection strengths 514 associated with edges 512 between nodes 510 may be based on directional connection strengths 516. For example, a user or an entity (represented by node 510-1) may report a connection strength 516-1 (such as 0.6), and another user or a counterparty (represented by node 510-2) may report a connection strength 516-2 (such as 0.8). The directional asymmetry of 0.2 may be less than a threshold value (such as 50% of the average of connection strengths 516-1 and 516-2), assuming the connection strengths are normalized. Consequently, connection strength 514-1 may be the average of connection strengths 516-1 and 516-2.

Subsequently, if one of the users associated with nodes 510 provides feedback about one of connection strengths 514, the computer system may determine a new value of the directional asymmetry for the associated edge 512, and then may perform one or more remedial actions based on the new value of the directional asymmetry.

Figure 6:
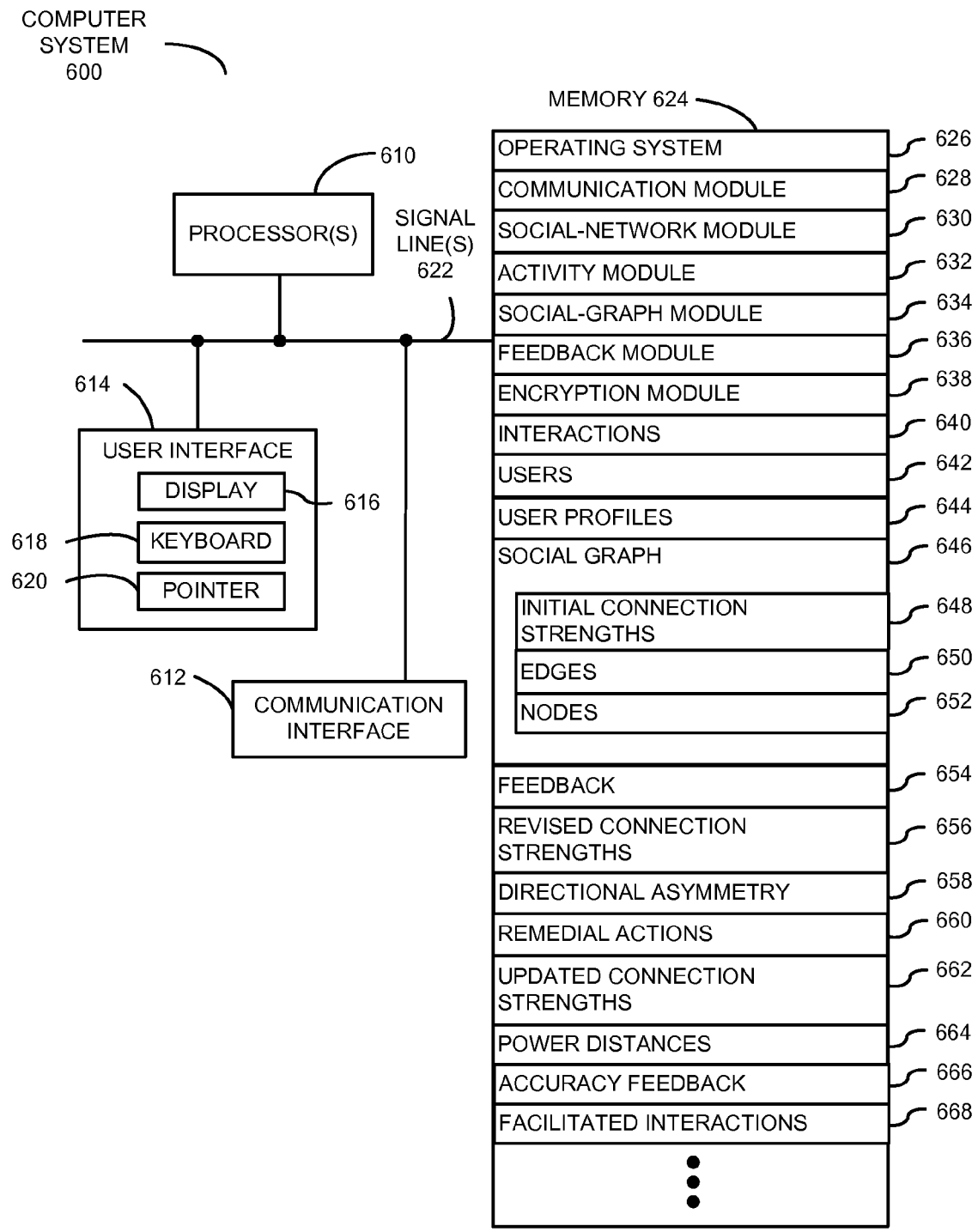
FIG. 6 is a block diagram illustrating a computer system that performs the methods of FIGS. 3 and 4 in accordance with an embodiment of the present disclosure.

We now describe embodiments of a computer system for performing a feedback technique, and its use. FIG. 6 presents a block diagram illustrating a computer system 600 that performs method 300 (FIGS. 3 and 4), such as computer system 410 in FIG. 4. Computer system 600 includes one or more processing units or processors 610 (which are sometimes referred to as a 'processing module'), a communication interface 612, a user interface 614, memory 624, and one or more signal lines 622 coupling these components together. Note that the one or more processors 610 may support parallel processing and/or multi-threaded operation, the communication interface 612 may have a persistent communication connection, and the one or more signal lines 622 may constitute a communication bus. Moreover, the user interface 614 may include: a display 616 (such as a touchscreen), a keyboard 618, and/or a pointer 620 (such as a mouse).

Memory 624 in computer system 600 may include volatile memory and/or non-volatile memory. More specifically, memory 624 may include: ROM, RAM, EPROM, EEPROM, flash memory, one or more smart cards, one or more magnetic disc storage devices, and/or one or more optical storage devices. Memory 624 may store an operating system 626 that includes procedures (or a set of instructions) for handling various basic system services for performing hardware-dependent tasks. Memory 624 may also store procedures (or a set of instructions) in a communication module 628. These communication procedures may be used for communicating with one or more computers and/or servers, including computers and/or servers that are remotely located with respect to computer system 600.

Memory 624 may also include multiple program modules (or sets of instructions), including: social-network module 630 (or a set of instructions), activity module 632 (or a set of instructions), social-graph module 634 (or a set of instructions), feedback module 636 (or a set of instructions) and/or encryption module 638 (or a set of instructions). Note that one or more of these program modules (or sets of instructions) may constitute a computer-program mechanism.

During operation of computer system 600, social-network module 630 facilitates interactions 640 among users 642 via communication module 628 and communication interface 612. These interactions may be tracked by activity module 632. Then, using interactions 640 (and, more generally, histories of activities) and/or user profiles 644, social-graph module 634 may estimate initial connection strengths 648 associated with edges 650 between nodes 652 in social graph 646.

Moreover, feedback module 636 may request feedback 654 from users 642 via communication module 628 and communication interface 612. In response, feedback module 636 may receive revised connection strengths 656 from users 642 via communication interface 612 and communication module 628.

For a given edge, which is associated with one or more of users 642 (the entity) and another of users 642 (the counterparty), feedback module 636 may determine directional asymmetry 658 based on revised connection strengths 656 provided by the entity and the counterparty. Then, feedback module 636 may perform one or more remedial actions 660 based on the determined directional asymmetry 658. For example, feedback module 636 may calculate updated connection strengths 662. More generally, feedback module 636 may: estimate power distances 664 between users 642; provide accuracy feedback 666 about an accuracy of initial connection strengths 648; and/or encourage facilitated interactions 668 between the entity and the counterparty via social-network module 630.

Because information in computer system 600 may be sensitive in nature, in some embodiments at least some of the data stored in memory 624 and/or at least some of the data communicated using communication module 628 is encrypted using encryption module 638.

Instructions in the various modules in memory 624 may be implemented in a high-level procedural language, an object-oriented programming language, and/or in an assembly or machine language. Note that the programming language may be compiled or interpreted, e.g., configurable or configured, to be executed by the one or more processors.

Although computer system 600 is illustrated as having a number of discrete items, FIG. 6 is intended to be a functional description of the various features that may be present in computer system 600 rather than a structural schematic of the embodiments described herein. In practice, and as recognized by those of ordinary skill in the art, the functions of computer system 600 may be distributed over a large number of servers or computers, with various groups of the servers or computers performing particular subsets of the functions. In some embodiments, some or all of the functionality of computer system 600 is implemented in one or more application-specific integrated circuits (ASICs) and/or one or more digital signal processors (DSPs).

Computer systems (such as computer system 600), as well as electronic devices, computers and servers in system 100 (FIG. 1), may include one of a variety of devices capable of manipulating computer-readable data or communicating such data between two or more computing systems over a network, including: a personal computer, a laptop computer, a tablet computer, a mainframe computer, a portable electronic device (such as a cellular phone or PDA), a server and/or a client computer (in a client-server architecture). Moreover, network 112 (FIG. 1) may include: the Internet, World Wide Web (WWW), an intranet, a cellular-telephone network, LAN, WAN, MAN, or a combination of networks, or other technology enabling communication between computing systems.

System 100 (FIG. 1) and/or computer system 600 may include fewer components or additional components. Moreover, two or more components may be combined into a single component, and/or a position of one or more components may be changed. In some embodiments, the functionality of system 100 (FIG. 1) and/or computer system 600 may be implemented more in hardware and less in software, or less in hardware and more in software, as is known in the art.

While a social network has been used as an illustration in the preceding embodiments, more generally the feedback technique may be used to improve the accuracy of the connection strengths (and, more generally, the information represented by or embodied in the social graph) for a wide variety of applications or systems that can be represented by a social graph. For example, the feedback technique may be used to adjust or revise the connection strengths or weights associated with edges between nodes in a social graph that represents communication or interactions among different entities (such as people, organizations, etc.). Note that the people may be loosely affiliated with a website (such as viewers or users of the website), and thus may include people who do not have predefined user accounts. Thus, the connections in the social graph may be defined less stringently than by explicit acceptance of requests by individuals to associate or establish connections with each other, such as people who have previously communicated with each other (or not) using a communication protocol, or people who have previously viewed each other's home pages (or not), etc. In this way, the feedback technique may be used to expand interactions and value-added services among relevant or potentially interested people in a more loosely defined group of people.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer-system-implemented method for adjusting a connection strength in a social graph, the method comprising:
    providing, to an entity, information specifying an initial connection strength associated with an edge between two nodes in the social graph, wherein the two nodes are associated, respectively, with the entity and a counterparty;
    receiving a first revised connection strength from the entity;
    using the computer, determining a directional asymmetry between the first revised connection strength and a second revised connection strength provided by the counterparty; and
    performing a remedial action regarding an adjusted connection strength of the edge based on the determined directional asymmetry.

2. The method of claim 1, wherein the remedial action includes estimating a power distance between the entity and the counterparty based on the determined directional asymmetry.

3. The method of claim 1, wherein the remedial action includes providing feedback about an accuracy of the initial connection strength.

4. The method of claim 1, wherein the remedial action includes updating the initial connection strength associated with the edge based on the determined directional asymmetry.

5. The method of claim 4, wherein the method further comprises comparing the first revised connection strength and the initial connection strength; and
    wherein the updating is further based on the comparison.

6. The method of claim 4, wherein updating the initial connection strength involves systematic under-relaxation based on a difference between the first revised connection strength and the initial connection strength.

7. The method of claim 4, wherein updating the initial connection strength involves normalization based on an average of connection strengths associated with edges between the entity and multiple counterparties in the social graph other than the counterparty.

8. The method of claim 4, wherein the updating is further based on time variation in responses from the entity to previous requests regarding connection strengths associated with edges between the entity and multiple counterparties in the social graph other than the counterparty.

9. The method of claim 1, wherein the remedial action includes providing an encouragement message to the entity to interact with the counterparty when the first revised connection strength is less than the second revised connection strength; and
    wherein the remedial action includes providing another encouragement message the counterparty to interact with the entity when the first revised connection strength is greater than the second revised connection strength.

10. The method of claim 1, wherein the information includes a range of connection strengths associated with edges between the entity and multiple counterparties in the social graph.

11. An apparatus, comprising:
    one or more processors;
    memory; and
    a program module, wherein the program module is stored in the memory and, during operation of the apparatus, is executed by the one or more processors to adjust a connection strength in a social graph, the program module including:
        instructions for providing, to an entity, information specifying an initial connection strength associated with an edge between two nodes in the social graph, wherein the two nodes are associated, respectively, with the entity and a counterparty;
        instructions for receiving a first revised connection strength from the entity;
        instructions for determining a directional asymmetry between the first revised connection strength and a second revised connection strength provided by the counterparty; and
        instructions for performing a remedial action regarding an adjusted connection strength of the edge based on the determined directional asymmetry.

12. The apparatus of claim 11, wherein the remedial action includes updating the initial connection strength associated with the edge based on the determined directional asymmetry.

13. The apparatus of claim 12, wherein the program module further includes instructions for comparing the first revised connection strength and the initial connection strength; and
    wherein the updating is further based on the comparison.

14. The apparatus of claim 12, wherein updating the initial connection strength involves systematic under-relaxation based on a difference between the first revised connection strength and the initial connection strength.

15. The apparatus of claim 12, wherein the updating is further based on time variation in responses from the entity to previous requests regarding connection strengths associated with edges between the entity and multiple counterparties in the social graph other than the counterparty.

16. The apparatus of claim 11, wherein the remedial action includes providing an encouragement message the entity to interact with the counterparty when the first revised connection strength is less than the second connection strength; and wherein the remedial action includes providing another encouragement message the counterparty to interact with the entity when the first revised connection strength is greater than the second connection strength.

17. A system, comprising:
a processing module configured to:
provide, to an entity, information specifying an initial connection strength associated with an edge between two nodes in the social graph, wherein the two nodes are associated, respectively, with the entity and a counterparty;
receive a first revised connection strength from the entity;
determine a directional asymmetry between the first revised connection strength and a second revised connection strength provided by the counterparty; and
perform a remedial action regarding an adjusted connection strength of the edge based on the determined directional asymmetry; and an interface module configured to receive, from an electronic device operated by an entity, the revised connection strength.

18. The system of claim 17, wherein the remedial action includes updating the initial connection strength associated with the edge based on the determined directional asymmetry.

19. The system of claim 18, wherein the processing module is further configured to compare the first revised connection strength and the initial connection strength; and
wherein the updating is further based on the comparison.

20. The system of claim 17, wherein the remedial action includes providing an encouragement message the entity to interact with the counterparty when the first revised connection strength is less than the second connection strength; and
wherein the remedial action includes providing another encouragement message the counterparty to interact with the entity when the first revised connection strength is greater than the second connection strength.

* * * * *